Feb. 21, 1950   R. SMID   2,497,915
INTERMITTENT PROJECTOR MOVEMENT

Original Filed Oct. 28, 1946   2 Sheets-Sheet 1

INVENTOR:
RUDOLPH SMID
BY Milo B. Stevens & Co.
ATTORNEYS.

Feb. 21, 1950 — R. SMID — 2,497,915
INTERMITTENT PROJECTOR MOVEMENT
Original Filed Oct. 28, 1946 — 2 Sheets-Sheet 2
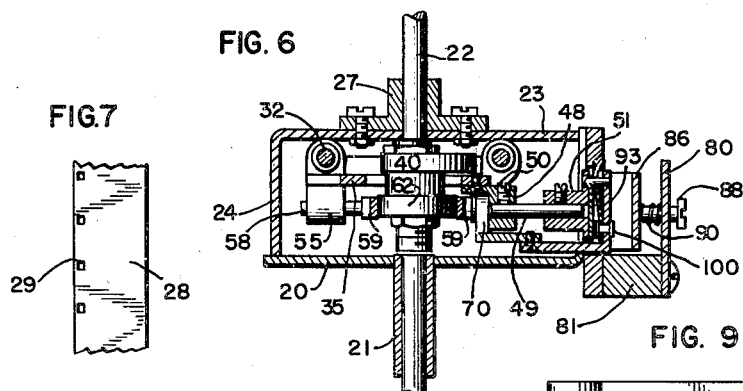
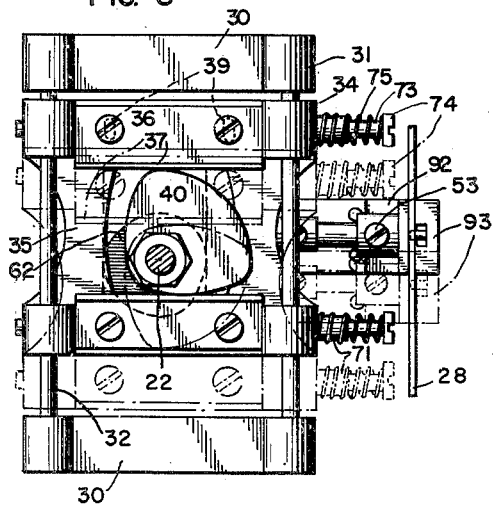
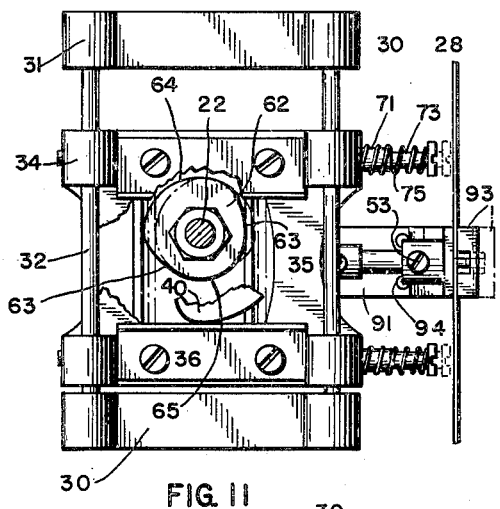
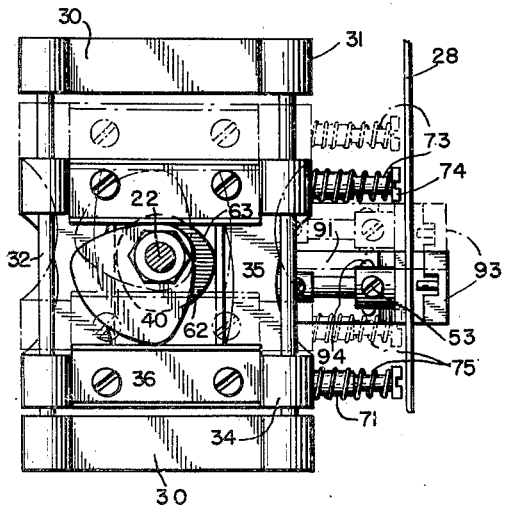
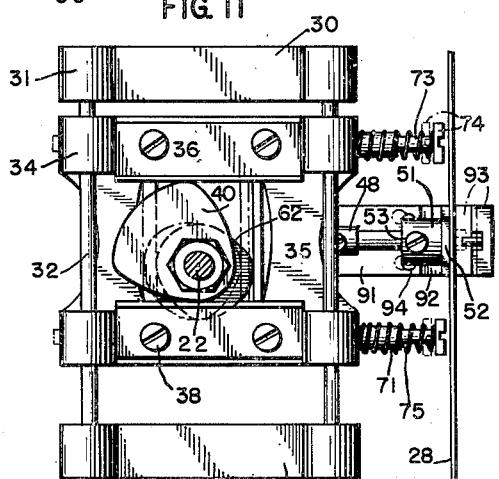
INVENTOR:
RUDOLPH SMID
BY Milo B. Stevens & Co.
ATTORNEYS.

Patented Feb. 21, 1950

2,497,915

UNITED STATES PATENT OFFICE 2,497,915

INTERMITTENT PROJECTOR MOVEMENT

Rudolph Smid, Chicago, Ill.

Substituted for application Serial No. 706,199, October 28, 1946. This application April 9, 1948, Serial No. 19,921

10 Claims. (Cl. 88—18.4)

My invention relates to film controls for motion picture projectors, and more particularly to mechanisms which impart the intermittent feeding movement to the film, and one object is to provide a mechanism which feeds the film smoothly and without injuring the same.

This application is a substitute, for abandoned application, Serial Number 706,199, filed October 28, 1946.

A further object is to combine a positive film advancing element with a coacting element which gently separates the film from the feed at the stops or intervals between the advancing movements of the film.

Another object is to provide spring means effective to hold the film in its normal path while the feed periodically releases the same.

An important object is to provide a rotary control for the film feed which is positive and quiet in operation.

With the above objects in view, and any others which may suggest themselves from the description to follow, a better understanding of the invention may be had by reference to the accompanying drawings, in which—

Figure 1:
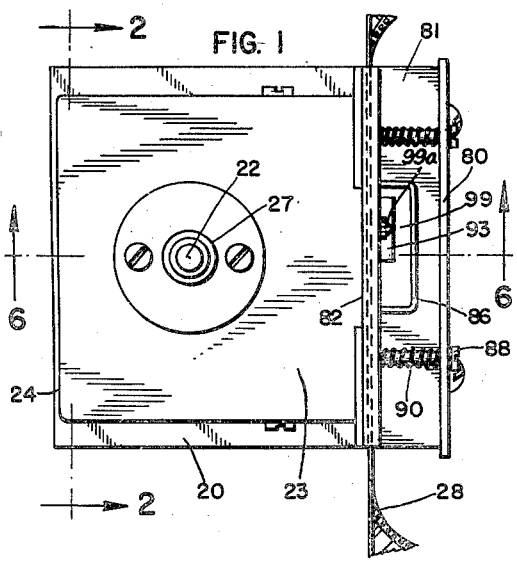
Fig. 1 is a side elevation of the mechanism as enclosed in a case and film guide.
Figure 2:
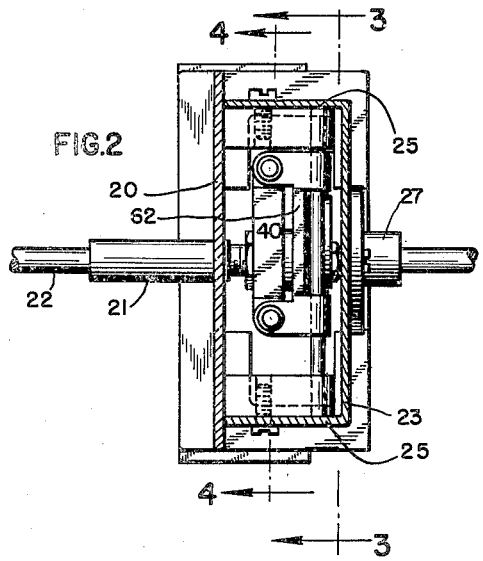
Fig. 2 is a section on the line 2—2 of Fig. 1.
Figure 3:
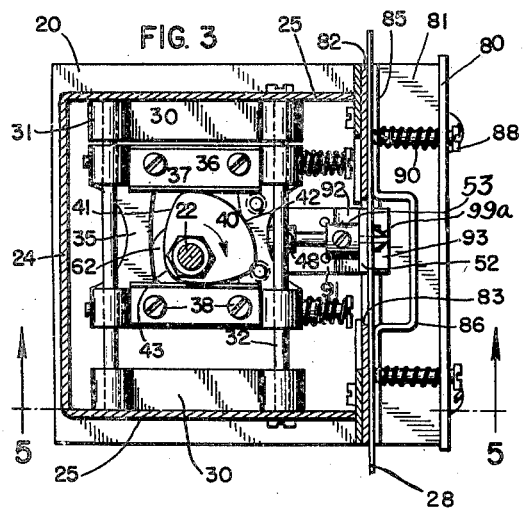
Figure 4:
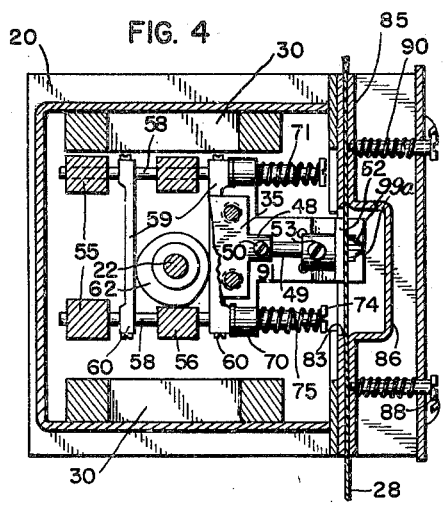
Figure 5:
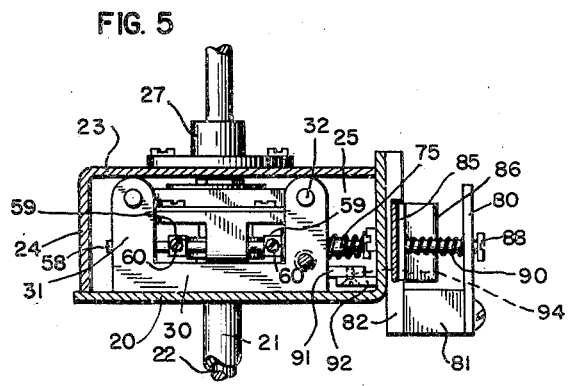
Figure 12:
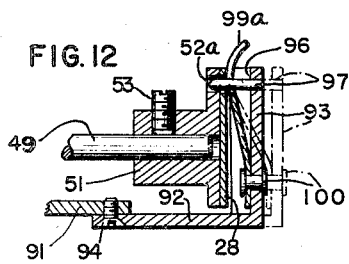

Figs. 3 and 4 are, respectively, sections on the lines 3—3 and 4—4 of Fig. 2;

Fig. 5 is a section on the line 5—5 of Fig. 3;

Fig. 6 is a section on the line 6—6 of Fig. 1;

Fig. 7 is an elevation of a fragment of the film;

Fig. 8 is an enlarged duplication of the film feed control in Fig. 3, with dotted lines showing a change of position;

Figs. 9 to 11 are views similar to Fig. 8 and illustrating other characteristics of the control; and Fig. 12 is an enlargement of the right-hand portion of Fig. 6, showing the film feed more clearly.

Referring specifically to the drawings, 20 denotes the base plate of the improved mechanism, the same being vertically positioned and extended from its outer side with a tubular bearing 21 for a drive shaft 22. The parts of the mechanism are almost entirely located on the inner side of the plate 20 and enclosed by a case 23 having a back wall 24 and top and bottom walls 25.

The shaft 22 is designed for rotation from the power element of the projector, the direction in which the shaft is rotated being immaterial. The shaft is partly journaled in the bearing 21, and passes through the case 23 to be additionally journaled in a bearing 27 carried by the same. The film 28 controlled by the mechanism is of the conventional variety indicated in Fig. 7 and having a row of perforations 29 along one edge.

The cycle of the film feed is to engage the film, draw it through a downstroke, disengage the film, and take an upstroke free of the same. For this purpose the mechanism contains a unit to impart the downstroke and upstroke and a second unit to procure the disengaging and engaging operation, both units being actuated in harmonious sequence by the rotation of the shaft 22.

For the operation of the downstroke and upstroke of the film feed, a mechanism carried by the plate 20 is employed. Accordingly, the plate has a pair of upper and lower brackets 30 on the inner side, these having laterally spaced arms 31. Each vertical pair of arms carries a rod 32; and the rods form ways for ears 34 at the corner of a carriage 35 to render the carriage slidable along the rods, or in a vertical direction. The carriage is formed with a pair of angle plates 36 whose flanges 37 occur in opposed relation. The plates 36 are applied to the carriage by means of screws 38 passed through elongated slots 39 in the plates. Thus, these may be adjusted toward and away from each other to fix the position of the flanges 37.

The shaft 22 carries a cam 40 between the flanges 37 of the angle plates 36. The cam has uniformly climbing edges 41 between short and long part-circular portions 42 and 43. Thus, these portions serve as dwells in respect to the flanges 37, while the edges 41 serve to alternately raise and lower the carriage 35 as the shaft is rotated in either direction.

The carriage 35 has a frontal block 48 in which a rod 49 is inserted with one end from the front and retained in the block by a set screw 50. The other end of the rod 49 is inserted in the shank 51 of a vertical plate 52 such shank receiving a set screw 53 to fix the shank on the rod. The plate 52 is designed to form a backing guide for the film 28, and it is understood that such guide is made to be removable from the carriage by means of the set screw 50 and adjustable relative to the same by means of the set screw 53. So far as described, the mechanism has no effect on the film, only providing a guide along the back side thereof.

The means for periodically advancing the film and releasing the same at the end of each advance will now be described. It is noted that the carriage 35 has a pair of vertically spaced bearings 55 at the rear and another pair of similarly spaced bearings 56 in the center. These bearings serve for the slidable disposal of a pair of horizontal rods 58. These are spanned by a pair of vertical bars 59 through the end portions of which the rods pass, such end portions being secured to the rods by screws 60. The bars 59 are designed to serve as followers on opposite sides of a cam 62 carried by the drive shaft 22. As in the previous case, the cam 62 has a pair of climbing edge portions 63 between part-circular dwell portions 64 and 65, although the climb of the present cam is much less than that of the cam 40. It is now understood that the screws 60 serve to space the bars 59 for a proper relation with the edge of the cam 62.

The horizontal rods 58 are forwardly extended to slidably receive a cross-head 70, and further extended to receive sleeves 71. The rods terminate as screws to receive nuts 73 formed with nicked heads 74. Compression springs 75 occur between the heads 74 and the cross-head 70.

The film guide may be of any conventional form, having a front wall 80, a side wall 81 and a rear wall 82. The latter has an opening 83 into which the plate 52 freely extends, such plate being substantially in the plane of the rear wall 82. The film 28 is designed to move along the frontal face of such wall, and is urged thereagainst by the feet 85 of an arched presser plate 86. The said feet receive screws 88 from the front of the wall 80; and springs 90 are coiled around the screws between the wall 80 and the presser plate feet 85 to yieldably engage the presser plate with the film.

The cross-head 70 is extended forwardly with a short medial stem 91 to which a lateral bend 92 of a headpiece 93 is secured by screws 94. The headpiece occurs directly in front of the plate 52 and travels up and down with the same because the plate is rigidly attached to the carriage and the headpiece receives its vertical support from the latter. On the other hand, the headpiece is free to move horizontally in forward direction to recede from the plate 52 as well as in rearward direction to approach the same, this motion being controlled by the rotation of the cam 62 in relation to the follower bars 59.

The rear face of the headpiece 93 has a medial horizontal groove 96 opening at the free end of the headpiece. Near such end a stud 97 projects rearwardly from the floor of the groove. Thus, when the headpiece is close to the film 28, the stud has advanced through a given perforation 29 thereof into a registering perforation 52a made in the plate 52, so that when the headpiece and the plate descend together, the stud draws the film through a downstroke. The free end of the stud is rounded to facilitate its entrance into the film perforation 29.

The groove 96 receives in its closed end one end of a leaf spring 99, such leaf spring end being secured to the headpiece by a rivet 100. The opposite end of the leaf spring is forked at 99a to freely straddle the stud 97. The tension of the spring 99 is rearward from the headpiece, as indicated by dotted lines in Fig. 12, and the greater portion of the spring recedes into the groove 96 when the headpiece closes on the film as indicated by full lines in the same figure. However, when the headpiece and plate 52 reach the lower end of the downstroke, the cam 62 acts to move the headpiece in the forward direction. This action operates to withdraw the stud 97 from the plate and film perforations 52 and 29. However, in case the film has a tendency to cling to and move with the stud, the automatic relaxation of the spring 99 from the full-line to the dotted-line position of Fig. 12 will insure the separation of the film from the stud, whereby to free the film from the head piece before the latter assumes its upward stroke. The headpiece and the plate 52 thus rise with the headpiece away from the film while the latter is stationary. When the headpiece has reached the upper end of its stroke the stud 97 will arrive at a height even with the next upper film perforation 29, so that the closing of the headpiece on the film by the action of the cam 62 will project the stud through the said perforation and again secure a positive hold on the film.

Ordinarily, the cross-head 70 and the headpiece 93 move as one with the follower bars 59, this presupposing that the film is passing smoothly through the guide. However, where the film contains a splice, the headpiece must yield to allow the thicker portion of the film sufficient clearance, and it does this by drawing on the cross-head 70 against the springs 75. This feature also permits the advance of the headpiece when the film is to be threaded through the device between the headpiece and the plate 52.

It is now apparent that the novel mechanism has several meritorious features. First, it mounts the driving cam along the single shaft 22 and fixes the position of the latter in the bearings of the base plate and the case of the mechanism. Further, the carriage is compactly grouped around the shaft and includes both the vertical and horizontal controls for the movement of the film. Further, the film guide springs 90 may be designed to exert the proper pressure on the film to permit its uniform passage without undue friction. Further, the film feed includes both a positive propelling element for the film and an automatic device to release the same the moment the propelling element recedes from the film. Further, with the case walls 25 forming end limits for the rods 32, the latter may be made slidable in the bracket arms 31 and therefore removable therefrom to permit the entire working mechanism to be taken out from between the brackets and by way of the film guide opening 83 for repair, adjustment or other alteration. Finally, the novel mechanism is a compactly designed unit which can be conveniently installed in projectors of the conventional type.

While I have described the invention along specific lines, various minor changes or refinements may be made therein without departing from its principle, and I reserve the right to employ all such changes and refinements as may come within the scope and spirit of the appended claims.

I claim:

1. An intermittent projector movement comprising a film guide, a base plate, bearing means carried by the same, a carriage slidable in said bearing means in a path parallel to the course of film travel, an extension on said carriage at right angle to said bearing means forming a backing for the film, a unit transversely slidable in the carriage and provided with a headpiece positioned in front of the film and in horizontal alignment with said extension, means for producing a reciprocatory sliding movement on the part of the carriage and a like transverse movement on the part of said unit in a manner to move said extension and headpiece in unison along the course of the film and to periodically advance said headpiece toward the path of the film, means carried by the headpiece to positively engage the film on such advance, and other means releasing said film on the retracting movement of the headpiece.

2. The structure of claim 1, the means carried by the headpiece being a stud adapted to enter the conventional traction perforation of the film.

3. The structure of claim 1, said means for releasing the film being a spring adapted to engage the frontal side of the film.

4. The structure of claim 1, said means for releasing the film being a spring adapted to engage the frontal side of the film, such spring being carried by the headpiece.

5. The structure of claim 1, said means for releasing the film being a spring adapted to engage the frontal side of the film, such spring being carried by the headpiece and tensioned to bear rearwardly on the film.

6. The structure of claim 1, said means for releasing the film being a spring adapted to engage the frontal side of the film, such spring being carried by the headpiece and tensioned to bear rearwardly on the film, the means carried by the headpiece being a stud, and said spring having a perforation for the passage of the stud on the retracting movement of the headpiece.

7. The structure of claim 1, said means for releasing the film being a spring adapted to engage the frontal side of the film, such spring being carried by the headpiece and tensioned to bear rearwardly on the film, the means carried by the headpiece being a stud, said spring having a perforation for the passage of the stud on the retracting movement of the headpiece, and the latter having a groove opposite the spring and adapted to receive the same in such event.

8. The structure of claim 1, the headpiece being separate from the unit, and yieldable means holding the headpiece in engagement with the unit, such yieldable means being effective to permit the separation of the headpiece from said extension in the event of the passage of a splice or otherwise thickened film portion therebetween.

9. An intermittent projector movement comprising a film guide, a base plate, bearing means carried by said base plate, said means comprising upper and lower spaced brackets having laterally spaced arms, vertically disposed rods journalled in said arms for joining said brackets, a carriage slidable on said rods in a path parallel to the course of film travel, means on said carriage and at right angles to said rods forming a backing for the film, a unit transversely slidable in the carriage and formed with a head piece positioned in front of the film, means for producing a reciprocatory sliding movement on the part of the carriage and a like transverse movement on the part of said unit in a manner to move said film backing means and head piece in unison along the course of the film and to periodically advance said head piece toward the path of the film, means carried by the head piece to positively engage the film on such advance, and other means releasing said film on the retracting movement of the head piece.

10. An intermittent projector movement comprising a film guide, a base plate, bearing means carried by said base plate, said means comprising upper and lower spaced brackets having laterally spaced arms, vertically disposed rods journalled in said arms for joining said brackets, a carriage slidable on said rods in a path parallel to the course of film travel, means on said carriage and at right angles to said rods forming a backing for the film, a unit transversely slidable in the carriage and formed with a head piece positioned in front of the film, said head piece being united with said film backing means in a manner to move vertically therewith or to move horizontally in a forward or rearward direction independently of said backing means, means for producing a reciprocatory sliding movement on the part of the carriage and a like transverse movement on the part of said unit in a manner to move said film backing means and head piece in unison along the course of the film and to periodically advance said head piece toward the path of the film, means carried by the head piece to positively engage the film on such advance, and other means releasing said film on the retracting movement of the head piece.

RUDOLPH SMID.

REFERENCES CITED

The following references are of record in the file of this patent:

UNITED STATES PATENTS

| Number | Name | Date |
| --- | --- | --- |
| 1,305,002 | Oiler | May 27, 1919 |
| 1,403,339 | Mitchell | Jan. 10, 1922 |
| 2,037,972 | Gillet | Apr. 21, 1936 |
| 2,174,579 | Griffin et al. | Oct. 3, 1939 |

FOREIGN PATENTS

| Number | Country | Date |
| --- | --- | --- |
| 103,511 | Great Britain | Jan. 26, 1917 |